(12) United States Patent
Yeo

(10) Patent No.: US 8,970,530 B2
(45) Date of Patent: Mar. 3, 2015

(54) DISPLAY DEVICE AND METHOD FOR GENERATING VIBRATIONS IN DISPLAY DEVICE

(71) Applicant: Samsung Display Co., Ltd., Yongin (KR)

(72) Inventor: Yong-Seok Yeo, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 110 days.

(21) Appl. No.: 13/753,743

(22) Filed: Jan. 30, 2013

(65) Prior Publication Data

US 2014/0062910 A1 Mar. 6, 2014

(30) Foreign Application Priority Data

Aug. 31, 2012 (KR) .................. 10-2012-0096795

(51) Int. Cl.
*G06F 3/041* (2006.01)
*G06F 3/01* (2006.01)
*G06F 3/0488* (2013.01)

(52) U.S. Cl.
CPC ............. *G06F 3/016* (2013.01); *G06F 3/0488* (2013.01)

USPC ........................................ 345/173; 178/18.03

(58) Field of Classification Search
USPC ........................................................ 345/173
See application file for complete search history.

(56) References Cited

U.S. PATENT DOCUMENTS

| | | |
|---|---|---|
| 5,903,087 A | 5/1999 | Mattson et al. |
| 5,920,146 A | 7/1999 | Carroll et al. |
| 7,548,232 B2 | 6/2009 | Shahoian et al. |
| 7,656,388 B2 | 2/2010 | Schena et al. |
| 2009/0284485 A1* | 11/2009 | Colgate et al. ............... 345/173 |
| 2010/0271298 A1 | 10/2010 | Vice et al. |
| 2012/0206371 A1* | 8/2012 | Turunen et al. ............... 345/173 |
| 2013/0307789 A1* | 11/2013 | Karamath et al. ............ 345/173 |

FOREIGN PATENT DOCUMENTS

KR  2001-0013453 A  2/2001

* cited by examiner

*Primary Examiner* — Charles V Hicks
(74) *Attorney, Agent, or Firm* — Robert E. Bushnell, Esq.

(57) ABSTRACT

A device, such as a display device, including a plurality of vibration plates oscillating in response to one or more oscillation signals. While at least one of first vibration plates among the plurality of vibration plates are oscillating, effective oscillation does not occur in at least one of second vibration plates among the plurality of vibration plates.

20 Claims, 10 Drawing Sheets

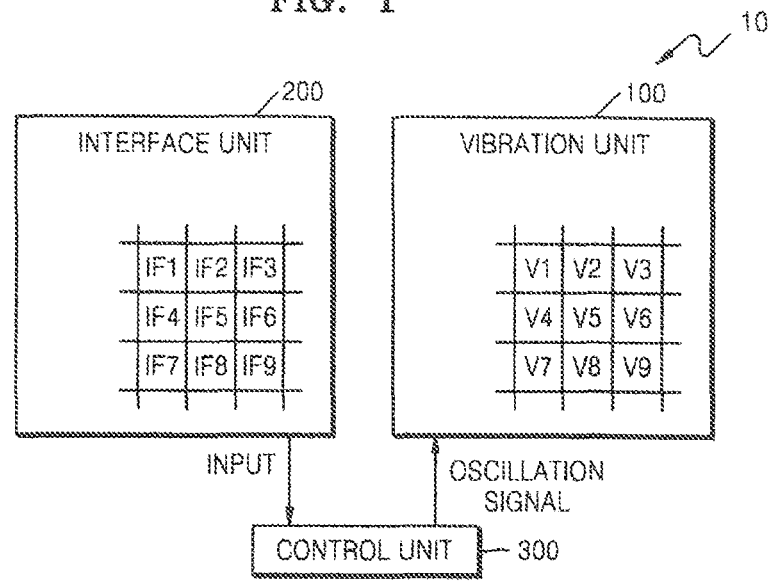
FIG. 2A
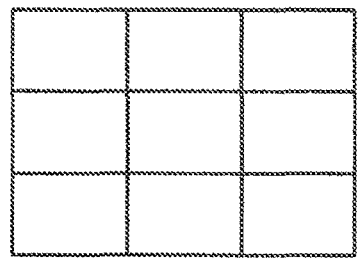
FIG. 2C
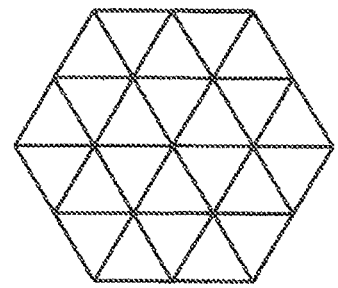
FIG. 2B
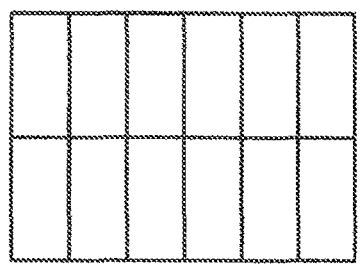
FIG. 2D
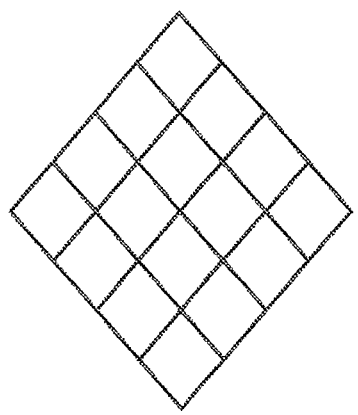

FIG. 5
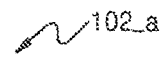
| U[1,1] L | U[1,2] L | U[1,3] L |
| --- | --- | --- |
| U[2,1] L | U[2,2] H | U[2,3] L |
| U[3,1] L | U[3,2] L | U[3,3] L |
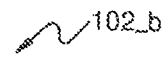
| L[1,1] H | L[1,2] H | L[1,3] H |
| --- | --- | --- |
| L[2,1] H | L[2,2] H | L[2,3] H |
| L[3,1] H | L[3,2] H | L[3,3] H |

FIG. 6

|  |  |  |
|---|---|---|
| U[1,1] L | U[1,2] L | U[1,3] L |
| U[2,1] L | U[2,2] H | U[2,3] L |
| U[3,1] L | U[3,2] L | U[3,3] L |

103_a

103_b

| L1[1,1] H1 | L2[1,1] H1 | L1[1,2] H1 | L2[1,2] H1 | L1[1,3] H1 | L2[1,3] H1 |
|---|---|---|---|---|---|
| L3[1,1] H1 | L4[1,1] H1 | L3[1,2] H1 | L4[1,2] H1 | L3[1,3] H1 | L4[1,3] H1 |
| L1[2,1] H1 | L2[2,1] H1 | L1[2,2] H1 | L2[2,2] H1 | L1[2,3] H1 | L2[2,3] H1 |
| L3[2,1] H1 | L4[2,1] H1 | L3[2,2] H1 | L4[2,2] H1 | L3[2,3] H1 | L4[2,3] H1 |
| L1[3,1] H1 | L2[3,1] H1 | L1[3,2] H1 | L2[3,2] H1 | L1[3,3] H1 | L2[3,3] H1 |
| L3[3,1] H1 | L4[3,1] H1 | L3[2,2] H1 | L4[3,2] H1 | L3[3,3] H1 | L4[3,3] H1 |

DISPLAY DEVICE AND METHOD FOR GENERATING VIBRATIONS IN DISPLAY DEVICE

CLAIM OF PRIORITY

This application makes reference to, incorporates the same herein, and claims all benefits accruing under 35 U.S.C. §119 from an application earlier filed in the Korean Intellectual Property Office on the 31 of Aug. 2012 and there duly assigned Ser. No. 10-2012-0096795.

BACKGROUND OF THE INVENTION

1. Field of the Invention

The present invention relates to a display device, and more particularly, to a display device including a vibration plate for generating partial vibrations.

2. Description of the Related Art

Display devices such as mobile phones that have become a necessity of life for many have evolved to compact, lightweight terminals with multi-functions of mp3 player, camera, and navigation. Display devices are also able to interface with users through sounds, vibrations, and images. As customers' needs are increasingly diverse with increasing demands for display devices, more attention is being paid to display devices for interfacing with users in various ways. Vibration, which is one of various interfacing methods, generally uses a mechanical eccentric motor to oscillate the entire display device. However, vibrating the entire display device hasn't satisfied user's demands for more precise interfacing. Thus, there is a need for a display device designed to allow partial vibration.

SUMMARY OF THE INVENTION

The present invention provides a display device designed to allow partial vibration.

According to an aspect of the present invention, there is provided a display device including a plurality of vibration plates oscillating in response to an oscillation signal, wherein while at least one of first vibration plates, among the plurality of vibration plates, are oscillating, effective oscillation does not occur in at least one of second vibration plates, among the plurality of vibration plates.

Oscillation of the at least one second vibration plate and oscillation of a third vibration plate, among the plurality of vibration plates, may cause destructive interference so that effective oscillation does not occur in the at least one second vibration plate.

The at least one second vibration plate may have sides, an upper surface, or a lower surface adjacent to the third vibration plate.

The plurality of vibration plates may be arranged in an N×N matrix. The at least one first vibration plate may be disposed inside the N×N matrix. The at least one second vibration plate may surround the at least one first vibration plate.

An upper or lower surface of the at least one second vibration plate may be adjacent to upper surfaces or lower surfaces of a plurality of fourth vibration plates, among the plurality of vibration plates, oscillation of the second vibration plate may interfere with oscillations of the plurality of fourth vibration plates, and the magnitude of effective oscillation of the second vibration plate may be determined according to oscillation of each of the plurality of fourth vibration plates.

The plurality of fourth vibration plates may construct one subgroup of M×M vibration plates.

Oscillations of the plurality of vibration plates may occur in a lateral or longitudinal direction.

The plurality of vibration plates may be arranged in an N×L matrix.

Each of the plurality of vibration plates may include a vibrator invoking oscillation in response to the oscillation signal and a case encompassing the vibrator and oscillating as the vibrator vibrates.

The vibrator may include Electro Active Polymer (EAP) or Piezo-Electric Material.

The display device may further include an interface unit receiving a user's input, wherein the plurality of vibration plates is oscillated according to the oscillation signal corresponding to the user's input.

According to another aspect of the present invention, there is provided a method of vibrating a display device including a plurality of vibration plates, including: generating a plurality of oscillation signals in response to an input in a control unit and vibrating the plurality of vibration plates in response to the plurality of oscillation signals. While at least one of first vibration plates among the plurality of vibration plates are oscillating, effective oscillation does not occur in at least one of second vibration plates among the plurality of vibration plates.

The plurality of oscillation signals may be generated so that oscillation of the at least one second vibration plate and oscillation of a third vibration plate among the plurality of vibration plates may cause destructive interference.

The at least one second vibration plate may have sides, an upper surface, or a lower surface adjacent to the third vibration plate.

The plurality of vibration plates may be arranged in an N×N matrix. The at least one first vibration plate may be disposed inside the N×N matrix. The at least one second vibration plate may surround the at least one first vibration plate.

An upper or lower surface of the at least one second vibration plate may be adjacent to upper surfaces or lower surfaces of a plurality of fourth vibration plates among the plurality of vibration plates, oscillation of the second vibration plate may interfere with oscillations of the plurality of fourth vibration plates, and the magnitude of effective oscillation of the second vibration plate may be determined according to oscillation of each of the plurality of fourth vibration plates.

The plurality of fourth vibration plates may construct one subgroup of M×M vibration plates.

Oscillations of the plurality of vibration plates may occur in a lateral or longitudinal direction.

The plurality of vibration plates may be arranged in an N×L matrix.

Each of the plurality of vibration plates may include a vibrator invoking oscillation in response to the oscillation signal and a case encompassing the vibrator and oscillating as the vibrator vibrates.

A display device according to another embodiment of the present invention may include: an interface unit receiving a user's input; a control unit generating a plurality of oscillation signals in response to the user's input; and a plurality of vibration plates oscillating in response to the plurality of oscillation signals. While at least one of first vibration plates among the plurality of vibration plates are oscillating, effective oscillation does not occur in at least one of second vibration plates among the plurality of vibration plates.

Oscillation of the at least one second vibration plate and oscillation of a third vibration plate among the plurality of vibration plates may cause destructive interference so that effective oscillation does not occur in the at least one second vibration plate.

Display devices having the above-described construction according to embodiments of the present invention configured above allow partial vibrations and more accurate and delicate interfacing.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 1 is a block diagram of a display device according to an embodiment of the present invention;

FIGS. 2A through 2D illustrate various vibration units according to embodiments of the present invention;

FIG. 5 illustrates two vibration units according to another embodiment of the present invention for explaining a destructive interference caused when an upper surface of each of a plurality of vibration plates in one vibration unit is adjacent to a lower surface of a corresponding one of a plurality of vibration plates in the other vibration unit (one-to-one matching);

FIG. 6 illustrates two vibration units according to another embodiment of the present invention for explaining destructive interference caused when upper surfaces of a plurality of vibration plates in one vibration unit are adjacent to lower surfaces of a plurality of vibration plates in the other vibration unit (one-to-many matching or many-to-one matching);

DETAILED DESCRIPTION OF THE INVENTION

Figure 3A:
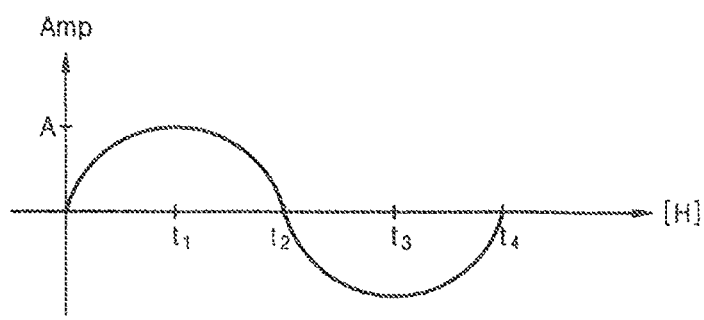
FIGS. 3A and 3B are timing diagram of oscillation signals being applied to each vibration plate according to an embodiment of the present invention.

Example embodiments of the invention will now be described more fully hereinafter with reference to the accompanying drawings, in which exemplary embodiments of the invention are shown. The exemplary embodiments are provided so that this disclosure will be thorough and complete, and will fully convey the scope of the invention to those with average knowledge in the art. This invention may, however, be embodied in many different forms and should not be construed as limited to the exemplary embodiments set forth herein but are to include all modifications, equivalents, or substitutions that fall within the true spirit and scope thereof. In the drawings, like numbers refer to like elements throughout. The relative dimensions of structures may be exaggerated or reduced for the sake of clarity.

The terminology used herein is for the purpose of describing particular exemplary embodiments only and is not intended to limit the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, integers, steps, operations, elements, components and/or groups thereof, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. For example, "a first element" discussed below could be termed a second element, and, similarly, a second element could be termed a first element, without departing from the scope of example embodiments of the present invention.

As used herein, expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a display device 10 according to an embodiment of the present invention.

The display device 10 includes a vibration unit 100, an interface unit 200, and a control unit 300. Although not shown, examples of the display device 10 may include a liquid crystal display (LCD), a light emitting diode (LED) display device, a plasma display panel (PDP), an MP3 player and other portable electric devices, and a TV large size display.

The interface unit 200 receives an input from a user. For example, the input received by the interface unit 200 may be a user's touch. The interface unit 200 is also partitioned into a plurality of interface portions IF1 through IF9.

The control unit 300 processes the input received from the interface unit 200, generates an oscillation signal, and transmits the oscillation signal to the vibration unit 100.

The vibration unit 100 causes the display device 10 to vibrate in response to the oscillation signal. The vibration unit 100 may include a plurality of vibration plates V1 through V9.

According to the present embodiment, while one of a plurality of vibration plates V1 through V9 in the vibration unit 100 is oscillating, another one of the plurality of vibration plates V1 through V9 may not oscillate.

In the display device 10 according to the present embodiment, when a user touches the interface portion IF5, only the vibration plate V5 corresponding to the interface portion IF5 may be subjected to oscillation. That is, the remaining vibration plates V1 through V4 and V6 through V9 may not be subjected to "effective oscillation".

Alternatively, when the user touches the interface portions IF5 and IF6, oscillation may occur only in the vibration plates V5 and V6 corresponding to the interface portions IF5 and IF6 while effective oscillation may not occur in the remaining vibration plates V1 through V4 and V7 through V9.

In the specification, the "effective oscillation" refers to apparent oscillation. When no effective oscillation occurs in a vibration plate, this means that the vibration plate is not subjected to actual oscillation due to interactions with other vibration plates even if an output signal is used to control the vibration plate to oscillate. The display device 10 according to the present embodiment is constructed to invoke destructive interference between oscillations of vibration plates and eliminate effective oscillations. Thus, the display device 10 allows partial vibrations, thereby providing more delicate interfacing.

FIGS. 2A through 2D illustrate various vibration units according to embodiments of the present invention. The vibration unit (100 in FIG. 1) may consist of a plurality of polygonal vibration plates, such as a plurality of square vibration plates (FIG. 2A), rectangular vibration plates (FIG. 2B), triangular vibration plates (FIG. 2C), or diamond vibration plates (FIG. 2D). The configuration, shape, size, or number of vibration plates may vary with different embodiments of the present invention. Although it is assumed hereinafter that the vibration unit 100 includes 9 vibration plates of a square shape, the present invention is not limited thereto.

Figure 3B:
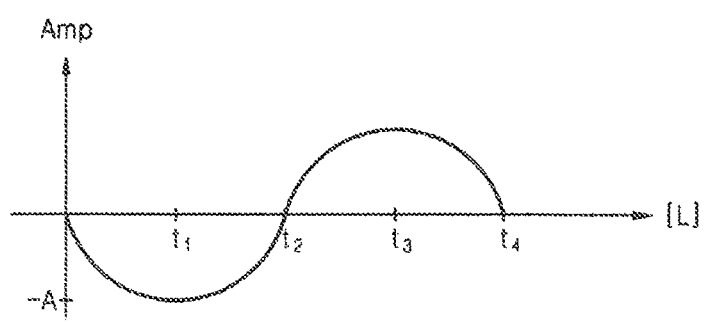

FIGS. 3A and 3B are timing diagram of oscillation signals H and L being applied to each vibration plate according to an embodiment of the present invention.

Referring to FIGS. 3A and 3B, the oscillation signals H and L are applied to a vibration plate over a period T of t4. Referring to FIG. 3A, the oscillation signal H reaches a maximum peak value A at t1 crosses the zero point at t2 (half cycle), reaches a minimum peak value −A at t3, and passes through the zero point again at t4 (full cycle). Conversely, referring to FIG. 3B, the oscillation signal L reaches a minimum peak value −A at t1, crosses the zero point at t2 (half cycle), reaches a maximum peak value A at t3, and passes through the zero point again at t4 (full cycle). That is, the oscillation signal H has a half cycle phase difference from the oscillation signal L.

Each vibration plate (V1 through V9 in FIG. 1) oscillates according to an oscillation signal being applied thereto. Thus, when oscillation of a vibration plate in response to the oscillation signal H interferes with oscillation of a vibration plate in response to the oscillation signal L, destructive interference occurs so as to eliminate effective oscillation.

Although the oscillation signals have a sine waveform, they may have various forms according to embodiments of the present invention. An oscillation signal may be a voltage signal. Furthermore, while FIGS. 3A and 3B show that an oscillation signal is applied to a vibration plate over one full cycle, the oscillation signal may have a different length according to the application.

Figure 4:
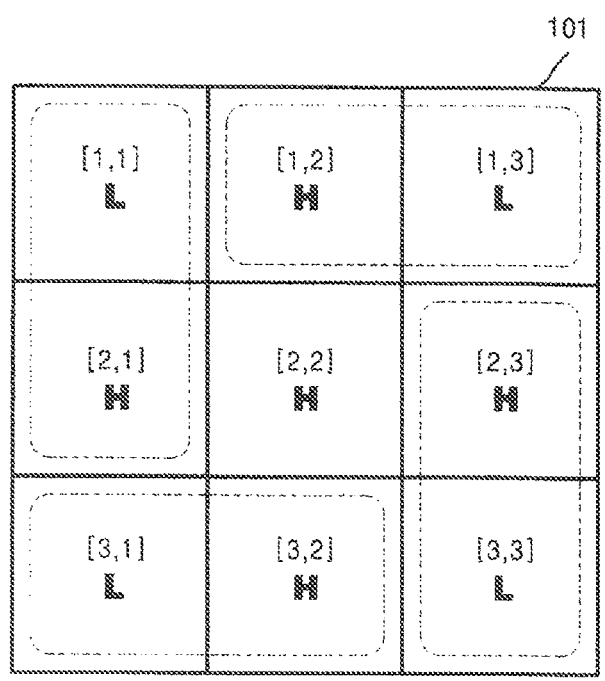
FIG. 4 illustrates a vibration unit according to an embodiment of the present invention for explaining a destructive interference between adjacent sides of a plurality of a vibration plates.

FIG. 4 illustrates a vibration unit 101 according to an embodiment of the present invention for explaining destructive interference between adjacent sides of a plurality of a vibration plates.

Referring to FIG. 4, the vibration unit 101 includes a plurality of vibration plates [1,1] through [3,3]. Each of the plurality of vibration plates [1,1] through [3,3] may vibrate in response to different oscillation signals. For example, the vibration plates [1,1], [1,3], [3,1], and [3,3] may oscillate in response to a first oscillation signal L having the same phase and amplitude. The vibration plates [1,2], [2,1], [2,2], [2,3], and [3,2] may oscillate in response to a second oscillation signal H. Such oscillations may occur in a lateral or longitudinal direction.

When the first oscillation signal L has an opposite phase to the second oscillation signal H, since the vibration plate [1,1] oscillated by the first oscillation signal L is adjacent to the vibration plate [2,1] oscillated by the second oscillation signal H, destructive interference occurs between oscillations of the vibration plates [1,1] and [2,1] so as to eliminate effective oscillations of the vibration plates [1.1] and [2,1]. Similarly, since the vibration plates [1,2] and [1,3] are adjacent to each other and oscillate in response to the first and second oscillation signals L and H, respectively, effective oscillations of the vibration plates [1,2] and [1,3] are removed. Effective oscillations of the vibration plates [2,3] and [3,3] and vibration plates [3,1] and [3,2] may be eliminated in a similar manner.

Consequently, only effective oscillation of the vibration plate [2,2] occurs. That is, the vibration plate [2,2] will undergo effective oscillation except for the vibration plates [1,1], [1,2], [1,3], [2,1], [2,3], [3,1], [3,2], and [3,3].

In addition to the above description, destructive interference may occur when vibration plates oscillated by the first and second oscillation signals L and H are adjacent to each other. For example, since the vibration plate [1,1] oscillated by the first oscillation signal L is adjacent to the vibration plate [1,2] oscillated by the second oscillation signal H, destructive interference is caused between oscillations of the vibration plates [1,1] and [1,2]. Due to the destructive interference, effective oscillation occurs only in the vibration plate [2,2] among the plurality of vibration plates [1,1] through [3,3], when all the vibrations plates are vibrating simultaneously.

Furthermore, when the plurality of vibration plates [1,1] through [3,3] oscillated by the first and second oscillation signals L and H are consecutively adjacent to one another, destructive interference may occur through many to many matching. More specifically, since the vibration plates [1,1], [1,3], [3,1], and [3,3] oscillated by the first oscillation signal L are consecutively adjacent to the vibration plates [1,2], [2,1], [2,3], and [3,2] oscillated by the second oscillation signal H, destructive interference occurs between oscillations of the vibration plates [1,1], [1,3], [3,1], and [3,3] and oscillations of the vibration plates [1,2], [2,1], [2,3], and [3,2]. Due to the destructive interference, effective oscillation occurs only in the vibration plate [2,2] among the plurality of vibration plates [1,1] through [3,3], when all the vibrations plates are vibrating simultaneously.

The operation of the display device 10 in which destructive interference occurs between adjacent sides of the plurality of vibration plates [1,1] through [3,3] will now be described in more detail with reference to FIGS. 1 and 4.

The vibration unit 101 in FIG. 4 includes the plurality of vibration plates [1,1] through [3,3] corresponding to the plurality of vibration plates V1 through V9 in the vibration unit 100 in FIG. 1. Repeated descriptions with respect to FIGS. 1 and 4 are omitted.

The control unit 300 generates an oscillation signal for each of the vibration plates V1 through V9 (or [1,1] through [3,3]) and causes partial vibrations to occur. For example, when a user touches the interface portion IF5 corresponding to the vibration plate (V5 in FIG. 1 or [2,2] in FIG. 4), only the vibration plate V5 or [2,2] may oscillate. In this case, the interface portion IF5 may be a touch panel. More specifically, upon a user's touching the interface portion IF5, the control unit 300 may recognize the user's touch through the interface portion IF5. Upon receipt of the user's touch from the interface portion IF5, the control unit 300 then generates an oscillation signal invoking an oscillation corresponding to the input and transmits the oscillation signal to the vibration unit 100 (or 101). In response to the oscillation signal received from the control unit 300, the plurality of vibration plates V1 through V9 (or [1,1] through [3,3]) may oscillate. The control unit 300 also adjusts a phase of the oscillation signal so that oscillations of some of the plurality of vibration plates V1 through V9 (or [1,1] through [3,3]) cause destructive interference. In this case, effective oscillation occurs only in the vibration plate V5 (or [2,2]). Thus, the display device 10 allows partial vibrations and more delicate interfacing.

FIG. 5 illustrates two vibration units 102_a and 102_b according to another embodiment of the present invention for explaining destructive interference caused when an upper surface of each of a plurality of vibration plates in one vibration unit 102_a is adjacent to a lower surface of a corresponding one of a plurality of vibration plates in the other vibration unit 102_b (one-to-one matching).

Referring to FIG. 5, the vibration unit 102_a includes a plurality of vibration plates U[1,1] through U[3,3]), and the vibration unit 102_b includes a plurality of vibration plates L[1,1] through L[3,3]. Each of the plurality of vibration plates U[1,1] through U[3,3]) is adjacent to a corresponding one of the plurality of vibration plates L[1,1] through L[3,3] (one-to-one matching). The vibration plates U[1,1] through U[3,3]) and L[1,1] through L[3,3] may oscillate in response to different oscillation signals. For example, the vibration plates U[1,1], U[1,2], U[1,3], U[2,1], U[2,3], U[3,1], U[3,2], and U[3,3] may oscillate in response to a first oscillation signal L while the vibration plates U[2,2] and L[1,1] through L[3,3] may oscillate in response to a second oscillation signal H. The oscillations may occur in a lateral or longitudinal direction. The vibration unit 102_a may be disposed adjacent to and above or below the vibration unit 102_b.

When the first oscillation signal L has an opposite phase to the second oscillation signal H, since the vibration plate U[1,1] oscillated by the first oscillation signal L is adjacent to the vibration plate L[1,1] oscillated by the second oscillation signal H, destructive interference occurs between oscillations of the vibration plates U[1,1] and L[1,1] so as to eliminate effective oscillations of the vibration plates U[1,1] and L[1,1]. Similarly, since the vibration plates U[2,1] and L[2,1] are adjacent to each other and oscillate in response to the first and second oscillation signals L and H, respectively, effective oscillations of the vibration plates U[2,1] and L[2,1] are removed. Likewise, oscillations of each of pairs of vibration plates U[3.1] and L[3,1], U[1,2] and L[1,2], U[3,2]) and L[3,2], U[1,3] and L[1,3], U[2,3] and L[2,3], and U[3,3] and L[3,3] may cause descriptive interference, so that effective oscillations of each pair of vibration plates are eliminated. Conversely, constructive interference is caused between oscillations of the vibration plates U[2,2] and L[2,2].

Consequently, effective oscillation occurs only in the vibration plates U[2,2] and L[2,2]. That is, the vibration plates U[2,2] and L[2.2] will undergo effective oscillation except for the vibration plates U[1,1], U[1,2], U[1,3], U[2,1], U[2,3], U[3,1], U[3,2], and U[3,3] and L[1,1], L[1,2], L[1,3], L[2,1], L[2,3], L[3,1], L[3,2], and L[3,3], when all the vibrations plates are vibrating simultaneously.

The operation of the display device 10 in which destructive interference occurs between adjacent upper and lower surfaces of the plurality of vibration plates U[1,1] through U[3.3] and L[1,1] through L[3,3] will now be described in more detail with reference to FIGS. 1 and 5.

The vibration unit 102_a in FIG. 5 has a configuration corresponding to the vibration unit 102_b in FIG. 5. The plurality of vibration plates U[1,1] through U[3,3] or L[1,1] through L[3,3] have a configuration corresponding to the plurality of vibration plates V1 through V9 in the vibration unit 100 in FIG. 1. Repeated descriptions with respect to FIGS. 1, 4, and 5 are omitted.

Upon a user's touching the interface portion IF5, the control unit 300 may recognize the user's touch through the interface portion IF5. Upon receipt of the user's touch from the interface portion IF5, the control unit 300 then generates an oscillation signal invoking an oscillation corresponding to the input and transmits the oscillation signal to the vibration unit 102_a or 102_b. In response to the oscillation signal received from the control unit 300, the plurality of vibration plates U[1,1] through U[3,3] and L[1,1] through L[3,3] may oscillate. The control unit 300 also adjusts a phase of the oscillation signal so that oscillations of some of the plurality of vibration plates U[1,1] through U[3.3] and L[1,1] through L[3,3] cause destructive interference. For example, effective oscillation may occur only in the vibration plates U[2,2] and L[2,2]. Thus, the display device 10 includes the vibration plates U[1,1] through U[3,3] and L[1,1] through L[3,3] whose upper and lower surfaces are adjacent to each other, thereby providing more delicate interfacing.

FIG. 6 illustrates two vibration units 103_a and 103_b according to another embodiment of the present invention for explaining destructive interference caused when upper surfaces of a plurality of vibration plates in one vibration unit 103_a are in close proximity to lower surfaces of a plurality of vibration plates in the other vibration unit 103_b (one-to-many matching or many-to-one matching).

Referring to FIG. 6, the vibration unit 103_a includes a plurality of vibration plates U[1,1] through U[3,3]), and the vibration unit 103_b includes a plurality of vibration plates L1[1,1] through L4[3,3]. Each of the plurality of vibration plates U[1,1] through U[3,3]) in the vibration unit 103_a is in close proximity to corresponding ones of the plurality of vibration plates L1[1,1] through L4[3,3] in the vibration unit 103_b (one-to-many matching). For example, the vibration plate U[1,1] may be in close proximity to four vibration plates L1[1,1] through L4[1,1]. In the same manner, each of the other vibration plates in the vibration unit 103_a may be adjacent to four vibration plates in the vibration unit 103_b.

The vibration plates U[1,1] through U[3,3]) and L1[1,1] through L4[3,3] may oscillate in response to different oscillation signals. For example, the vibration plates U[1,1], U[1,2], U[1,3], U[2,1], U[2,3], U[3,1], U[3,2], and U[3,3] may oscillate in response to a first oscillation signal L while the vibration plate U[2,2] may oscillate in response to a second oscillation signal H. The vibration plates L1[1,1] through L4[3,3] may oscillate in response to a third oscillation signal H1. The oscillations may occur in a lateral or longitudinal direction. The vibration unit 103_a may be disposed adjacent to and above or below the vibration unit 103_b. In the present embodiment, the third oscillation signal H1 is assumed to have the same phase but one quarter of amplitude of the second oscillation signal H. The first oscillation signal L is also assumed to have an opposite phase to the second oscillation signal H. The relationship between the first through third oscillation signals L, H, and H1 are shown in FIGS. 7A and 7B.

Figure 7A:
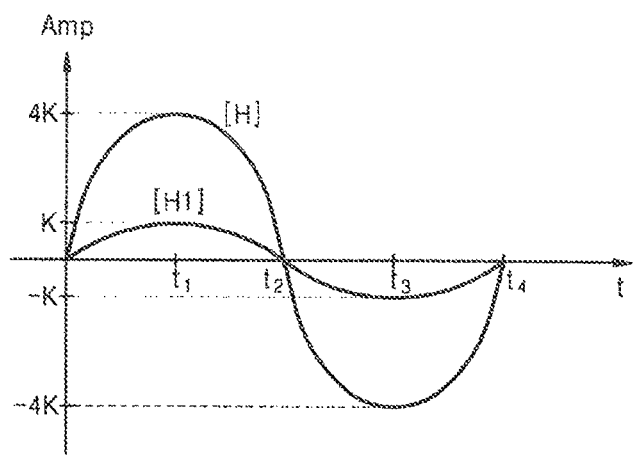
FIGS. 7A and 7B are timing diagrams of oscillation signals being applied to respective vibration plates according to another embodiment of the present invention.
Figure 7B:
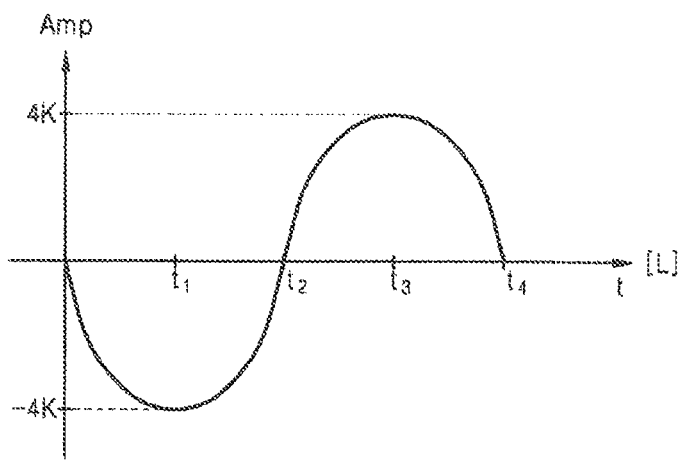

FIGS. 7A and 7B are timing diagrams of oscillation signals being applied to respective vibration plates according to another embodiment of the present invention.

Referring to FIGS. 7A and 7B, the oscillation signals H and L are similar to the oscillation signals H and L illustrated in FIGS. 3A and 3B except that the oscillation signals H and L have an amplitude of 4K that is four times an amplitude K of the oscillation signal H1.

Referring to FIG. 7A, the oscillation signal H1 reaches a maximum peak value K at t1, crosses the zero point at t2 (half cycle), reaches a minimum peak value −K at t3, and passes through the zero point again at t4 (full cycle). The oscillation signal H has four times the amplitude of the oscillation signal H1.

The oscillation signal H1 also has a half cycle phase difference from the oscillation signal L in FIG. 7B. Thus, when oscillations of four vibration plates in response to the oscillation signal H1 interfere with oscillation of one vibration plate in response to the oscillation signal L, destructive interference occurs so as to eliminate effective oscillation.

Although the oscillation signals H, L, and H1 have a sine waveform, they may have various forms according to embodiments of the present invention. Furthermore, while FIGS. 7A and 7B show that each oscillation signal is applied to a vibration plate over one full cycle, the oscillation signal may have a different length according to the application.

Referring to FIG. 6, since the vibration plate U[1,1] oscillated by the first oscillation signal L is adjacent to the four vibration plates L1[1,1] through L4[1,1] oscillated by the third oscillation signal H1, destructive interference occurs between oscillations of the vibration plates U[1,1] and L1[1,1] through L4[1,1] so as to eliminate effective oscillations of the vibration plates U[1,1] and L1[1,1] through L4[1,1]. Similarly, since the vibration plate U[2,1] and the vibration plates L1[2,1] through L4[2,1] are adjacent to each other and oscillate in response to the first and third oscillation signals L and H1, respectively, effective oscillations of the vibration plates U[2,1] and L1[2,1] through L4[2,1] are removed. Likewise, destructive interference may occur between oscillations of each subgroup including one vibration plate in the vibration unit 103_a and four vibration plates in the vibration unit 103_b adjacent thereto, so that effective oscillations of the subgroup are eliminated. On the other hand, constructive interference is caused between oscillations of the vibration plates U[2,2] and L1[2,2] through L4[2,2], so that effective oscillations occur only in the U[2,2] and L1[2,2] through L4[2,2], in another embodiment, oscillations of the vibration plates U[2,2] and L1[2,2] through L4[2,2] are turned on or off to adjust the magnitude of the constructive interference.

The operation of the display device 10 in which destructive interference occurs between adjacent upper and lower surfaces of the plurality of vibration plates U[1,1] through. U[3,3] and L1[1,1] through L4[3,3] will now be described in more detail with reference to FIGS. 1 and 6.

The vibration unit 103_a has a configuration corresponding to the vibration unit 103_b. The plurality of vibration plates U[1,1] through U[3,3] or L1[1,1] through L4[3,3] have a configuration corresponding to the plurality of vibration plates V1 through V9 in the vibration unit 100 in FIG. 1. Repeated descriptions with respect to FIGS. 1 and 6 are omitted.

Upon a users touching the interface portion IF5, the control unit 300 generates an oscillation signal invoking an oscillation corresponding to the user's touch and transmits the oscillation signal to the vibration unit 103_a or 103_b. In response to the oscillation signal received from the control unit 300, the plurality of vibration plates U[1,1] through U[3,3] and L1[1,1] through L4[3,3] may oscillate. Oscillations of the plurality of vibration plates U[1,1] through U[3,3] may interfere with oscillations of the plurality of vibration plates L1[1,1] through L4[3,3].

The control unit 300 adjusts a phase of the oscillation signal so that oscillations of some of the plurality of vibration plates U[1,1] through U[3,3] and L1[1,1] through L4[3,3] cause destructive interference. In this case, due to constructive interference, effective oscillations occurs only in the vibration plates U[2,2] and L1 [2,2] through L4[2,2]. The control unit 300 also controls the oscillation signal so that oscillations of some of the plurality of the plurality of vibration plates U[1,1] through U[3,3] and L1[1,1] through L4[3,3] cause destructive interference, thereby adjusting the magnitude of effective oscillations of U[2,2] and L1[2,2] through L4[2,2]. Thus, the display device 10 includes the vibration plates U[1,1] through U[3,3] and L1[1,1] through L4[3,3] whose upper and lower surfaces are adjacent to one another, thereby providing more delicate interfacing.

Figure 8:
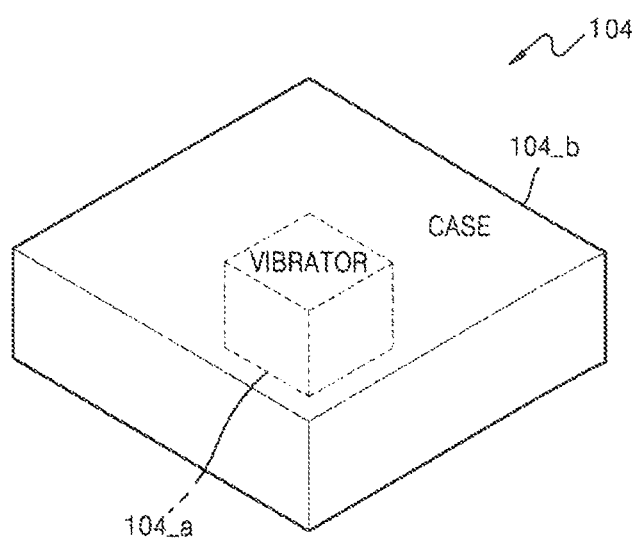
FIG. 8 illustrates one of a plurality of vibration plates according to an embodiment of the present invention.

FIG. 8 illustrates one of a plurality of vibration plates according to an embodiment of the present invention.

Referring to FIG. 8, a vibration plate 104 according to the present embodiment includes a vibrator 104_a and a case 104_b. The vibrator 104_a causes oscillation in response to an oscillation signal. The vibrator 104_a may contain Electro Active Polymer (EAP) or Piezo-Electric material. The EAP may include Polyvinylidene Fluoride (PVDF), Polydimethyl Siloxan (PDMS), and Poly Vinylidene Fluoride-Co-Trifluoroethylene (PVFT). The Piezo-Electric material may include Quartz and Barium Titanate.

Figure 9:
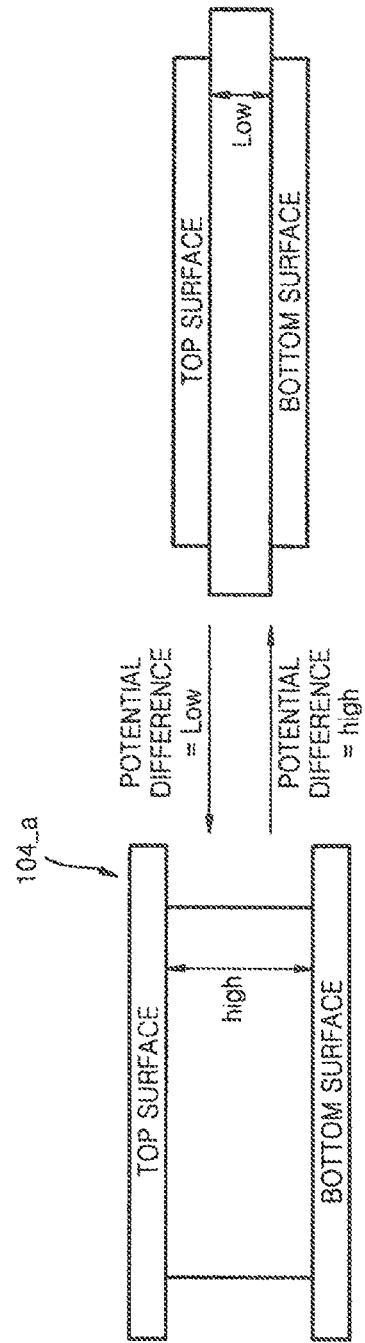
FIG. 9 is a diagram for explaining the operation of the vibrator in FIG. 8.

FIG. 9 is a diagram for explaining the operation of the vibrator 104_a. When the vibrator 104_a has a low potential difference between its top and bottom surfaces, the vibrator 104_a expands so that the top surface moves up with respect to the bottom surface. Conversely, when there is a high potential difference between the top and bottom surfaces, the vibrator 104_a contracts so that the top surface moves do with respect to the bottom surface. As the potential difference between the top and bottom surfaces continues to vary, the vibrator 104_a repeats expansion and contraction.

Referring to FIG. 8, the case 104_b encompasses the vibrator 104_a and oscillates as the vibrator 104_a vibrates. The case 104_b is sufficiently elastic so as to absorb some of vibrations of the vibrator 104_a. The case 104_b may be formed of Thermoplastic Elastomers. For example, the case 104_b may include Styrenics (S-TPE's), Copolyesters (COPE's), Polyurethanes (TPU's), Polyamides (PEBA's), Polyolefin Blends (TPO's), Polyolefin Plastomers (POP's), or Polyolefin Elastomers (POE's). For example, the case 104_b may contain Styrenic block copolymers, Polyolefin blends, Elastomeric alloys (TPE-v or TPV), Thermoplastic polyurethanes, Thermoplastic copolyester, or Thermoplastic polyamides. The vibration plate 104 according to the present embodiment includes the vibrator 104_a and the case 104_b, and the case is so elastic that oscillation of the vibration plate 104 may not affect other vibration plates.

Figure 10A:
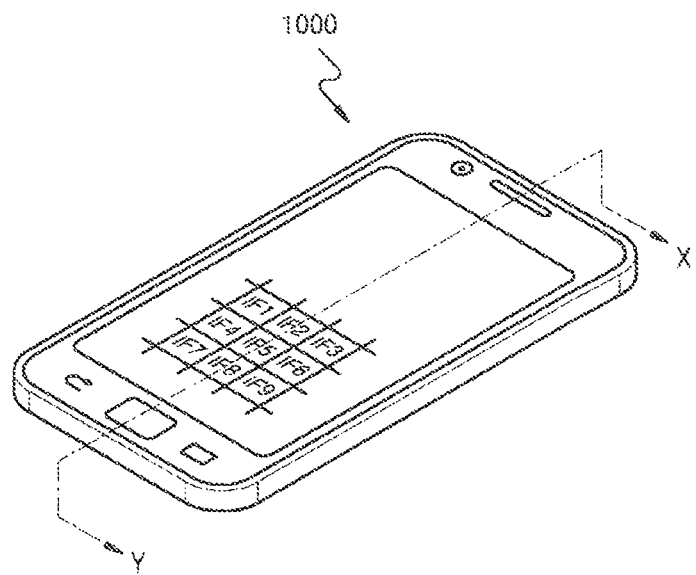
FIG. 10A illustrates a mobile phone designed to allow partial vibration according to an embodiment of the present invention.
Figure 10B:
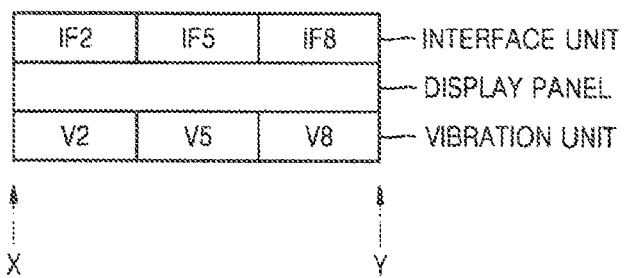
FIG. 10B is a cross-sectional view taken along X-Y direction of FIG. 10A for explaining the actual positions of an interface unit, a display panel, and a vibration unit according to an embodiment of the present invention.

FIG. 10A illustrates a mobile phone 1000 designed to allow partial vibration according to an embodiment of the present invention and FIG. 10B is a cross-sectional view of the mobile phone 1000 taken along the X-Y direction of FIG. 10A for explaining the actual positions of an interface unit, a display panel, and a vibration unit according to an embodiment of the present invention Referring to FIGS. 10A and 10B, when a user touches an interface portion IF5, a control unit transmits an oscillation signal invoking oscillation corresponding to the user's touch on the interface portion IF5 to the vibration unit. The control unit may control only a vibration plate V5 to cause effective oscillation in response to a phase-adjusted oscillation signal.

That is, upon touching the interface portion IF5, only the vibration plate V5 corresponding to the interface portion IF5 may oscillate.

Figure 11:
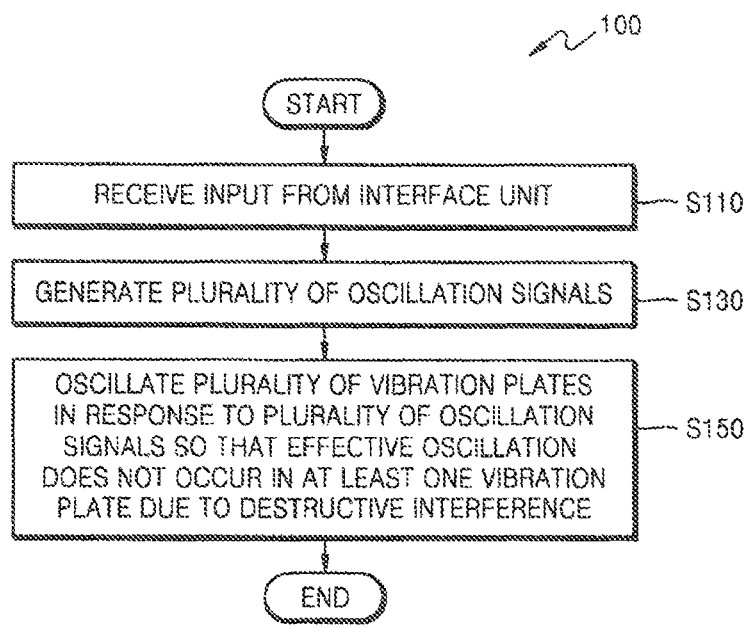
FIG. 11 is a flowchart of a method of generating partial vibrations in a display device according to an embodiment of the present invention.

FIG. 11 is a flowchart 100 of a method of generating partial vibrations in a display device according to an embodiment of the present invention.

Referring to FIG. 11, an interface unit receives an input (S110). The interface unit may be a touch panel, and the input may be a user's touch. The received input is then delivered to a control unit. Upon receiving the input, the control unit generates a plurality of oscillation signals that will be used for oscillating a plurality of vibration plates (S130). When the plurality of vibration plates oscillate in response to the plurality of oscillation signals, effective oscillation may not occur in at least one vibration plate due to destructive interference caused between oscillations of the plurality of vibration plates (S150). Thus, a method of vibrating the display device according to the present invention allows partial vibrations, thereby providing more delicate interfacing.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A display device comprising a plurality of vibration plates oscillating in response to an oscillation signal, wherein while at least one of first vibration plates among the plurality of vibration plates are oscillating, effective oscillation does not occur in at least one of second vibration plates among the plurality of vibration plates, wherein oscillation of the at least one second vibration plate and oscillation of a third vibration plate among the plurality of vibration plates cause destructive interference so that effective oscillation does not occur in the at least one second vibration plate.

2. The display device of claim 1, wherein the at least one second vibration plate has sides, an upper surface, or a lower surface adjacent to the third vibration plate.

3. The display device of claim 1, wherein the plurality of vibration plates are arranged in an N×N matrix, wherein the at least one first vibration plate is disposed inside the N×N matrix, and wherein the at least one second vibration plate surrounds the at least one first vibration plate.

4. The display device of claim 1, wherein the plurality of vibration plates are divided into N×N upper vibration plates and N×N lower vibration plates, wherein the at least one first vibration plate is disposed inside the N×N upper vibration plates and the N×N lower vibration plates, and the at least one first vibration plate among the N×N upper vibration plates are adjacent to the at least one second vibration plate among the N×N lower vibration plates, respectively , and wherein the at least one second vibration plate surrounds the at least one first vibration plate.

5. The display device of claim 1, wherein an upper or lower surface of the at least one second vibration plate is adjacent to upper surfaces or lower surfaces of a plurality of fourth vibration plates among the plurality of vibration plates, oscillation of the second vibration plate interferes with oscillations of the plurality of fourth vibration plates, and the magnitude of effective oscillation of the second vibration plate is determined according to oscillation of each of the plurality of fourth vibration plates.

6. The display device of claim 5, wherein the plurality of fourth vibration plates constructs one subgroup of M×M vibration plates.

7. The display device of claim 1, wherein oscillations of the plurality of vibration plates occur in a lateral or longitudinal direction.

8. The display device of claim 1, wherein the plurality of vibration plates are arranged in an N×L matrix.

9. The display device of claim 1, wherein each of the plurality of vibration plates comprises a vibrator invoking oscillation in response to the oscillation signal and a case encompassing the vibrator and oscillating as the vibrator vibrates.

10. The display device of claim 9, wherein the vibrator includes one of Electro Active Polymer (EAP) and Piezo-Electric Material.

11. The display device of claim 9, wherein the case includes Thermoplastic Elastomers.

12. The display device of claim 1, further comprising an interface unit receiving a user's input, wherein the plurality of vibration plates is oscillated according to the oscillation signal corresponding to the user's input.

13. A method of vibrating a display device including a plurality of vibration plates, the method comprising:

generating a plurality of oscillation signals in response to an input in a control unit and vibrating the plurality of vibration plates in response to the plurality of oscillation signals, such that, while at least one of first vibration plates among the plurality of vibration plates are oscillating, effective oscillation does not occur in at least one of second vibration plates among the plurality of vibration plates, wherein the plurality of oscillation signals are generated so that oscillation of the at least one second vibration plate and oscillation of a third vibration plate among the plurality of vibration plates cause destructive interference.

14. The method of claim 13, wherein at least one second vibration plate has sides, an upper surface, or a lower surface adjacent to the third vibration plate.

15. The method of claim 13, wherein an upper or lower surface of the at least one second vibration plate is adjacent to upper surfaces or lower surfaces of a plurality of fourth vibration plates among the plurality of vibration plates, oscillation of the second vibration plate interferes with oscillations of the plurality of fourth vibration plates, and the magnitude of effective oscillation of the second vibration plate is determined according to oscillation of each of the plurality of fourth vibration plates.

16. The method of claim 15, wherein the plurality of fourth vibration plates constructs one subgroup of M×M vibration plates.

17. The method of claim 13, wherein oscillations of the plurality of vibration plates occur in a lateral or longitudinal direction.

18. The method of claim 13, wherein the plurality of vibration plates are arranged in an N×L matrix.

19. The method of claim 13, wherein each of the plurality of vibration plates comprises a vibrator invoking oscillation in response to the oscillation signal and a case encompassing the vibrator and oscillating as the vibrator vibrates.

20. A display device comprising:

an interface unit receiving a user's input;

a control unit generating a plurality of oscillation signals in response to the user's input; and a plurality of vibration plates oscillating in response to the plurality of oscillation signals, wherein while at least one of first vibration plates among the plurality of vibration plates are oscillating, effective oscillation does not occur in at least one of second vibration plates among the plurality of vibration plates, wherein oscillation of the at least one second vibration plate and oscillation of a third vibration plate among the plurality of vibration plates cause destructive interference so that effective oscillation does not occur in the at least one second vibration plate.

* * * * *